US012641304B1

(12) United States Patent
Patel et al.

(10) Patent No.: US 12,641,304 B1
(45) Date of Patent: *May 26, 2026

(54) DYNAMIC CLEAR LEAD INJECTION

(71) Applicant: Amazon Technologies, Inc., Seattle, WA (US)

(72) Inventors: Ronak Patel, Boston, MA (US); Jordan Apgar, Columbia, NJ (US); Saurabh Gandhi, Edison, NJ (US); Adish Agarwal, Lyndhurst, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,680

(22) Filed: Nov. 4, 2024

Related U.S. Application Data

(63) Continuation of application No. 18/079,406, filed on Dec. 12, 2022, now Pat. No. 12,167,053.

(51) Int. Cl.
| | |
|---|---|
| *H04N 21/2347* | (2011.01) |
| *H04N 21/233* | (2011.01) |
| *H04N 21/239* | (2011.01) |
| *H04N 21/254* | (2011.01) |
| *H04N 21/845* | (2011.01) |

(52) U.S. Cl.
CPC ..... *H04N 21/23476* (2013.01); *H04N 21/233* (2013.01); *H04N 21/2393* (2013.01); *H04N 21/254* (2013.01); *H04N 21/8455* (2013.01)

(58) Field of Classification Search
CPC ........... H04N 21/23476; H04N 21/233; H04N 21/2393; H04N 21/254; H04N 21/8455
See application file for complete search history.

(56) References Cited

U.S. PATENT DOCUMENTS

| | | | |
|---|---|---|---|
| 2007/0212030 A1 | 9/2007 | Koga et al. | |
| 2021/0258624 A1* | 8/2021 | Garfinkel | H04N 21/8456 |

OTHER PUBLICATIONS

U.S. Appl. No. 18/079,406, "Final Office Action", May 22, 2024, 5 pages.
U.S. Appl. No. 18/079,406, "Non-Final Office Action", Oct. 13, 2023, 10 pages.
U.S. Appl. No. 18/079,406, "Notice of Allowance", Aug. 7, 2024, 8 pages.

* cited by examiner

*Primary Examiner* — Yassin Alata
(74) *Attorney, Agent, or Firm* — Kilpatrick Townsend & Stockton LLP

(57) ABSTRACT

Techniques implementable by a computer system are provided. The techniques include sending a request to stream media content. The request can include a media content identifier and a streaming start point in the media content. The techniques also include receiving an encrypted portion of a media stream for the media content. The encrypted portion can be encrypted by an encryption key. The portion can begin at a silence point. The silence point can be at or after a threshold time length beyond the streaming start point. The techniques also include receiving the encryption key. The techniques also include presenting the encrypted portion of the media stream.

20 Claims, 6 Drawing Sheets

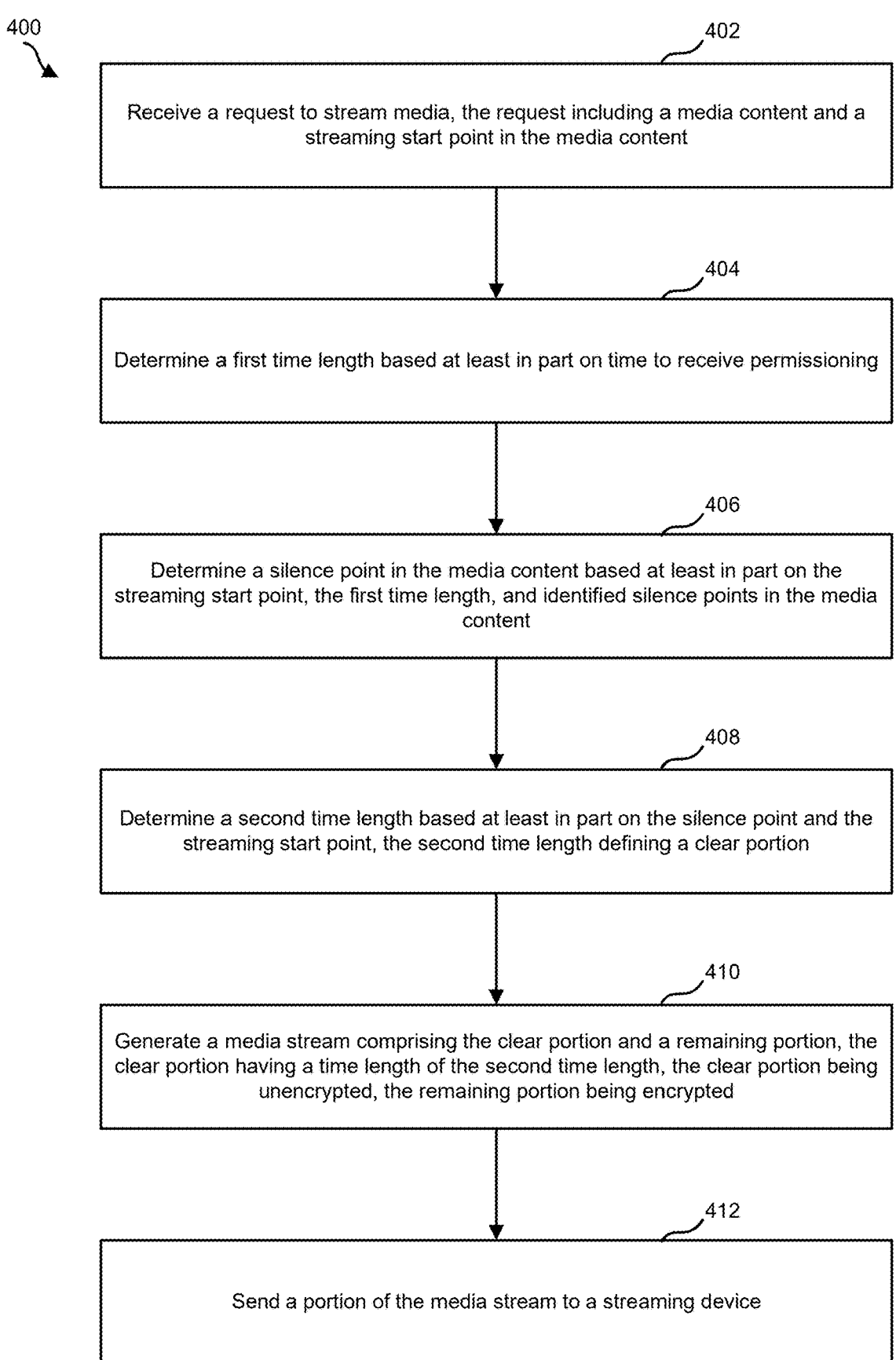

400

402

Receive a request to stream media, the request including a media content and a streaming start point in the media content

404

Determine a first time length based at least in part on time to receive permissioning

406

Determine a silence point in the media content based at least in part on the streaming start point, the first time length, and identified silence points in the media content

408

Determine a second time length based at least in part on the silence point and the streaming start point, the second time length defining a clear portion

410

Generate a media stream comprising the clear portion and a remaining portion, the clear portion having a time length of the second time length, the clear portion being unencrypted, the remaining portion being encrypted

412

Send a portion of the media stream to a streaming device

FIG. 4

DYNAMIC CLEAR LEAD INJECTION

CROSS REFERENCE TO RELATED APPLICATIONS

This application is a Continuation of U.S. Non-Provisional application Ser. No. 18/079,406, filed Dec. 12, 2022, and entitled "DYNAMIC CLEAR LEAD INJECTION". The content of which is herein incorporated by reference in its entirety.

BACKGROUND

As speeds for data transfer have increased and the communication infrastructure has increased in capacity, more users and associated devices are streaming media. Many forms of media are streamed such as videos, music, audiobooks, and other creative works. Digital rights management (DRM) software and other types of software are used for permissioning users and their associated devices to stream the media.

BRIEF DESCRIPTION OF THE DRAWINGS

Various embodiments in accordance with the present disclosure will be described with reference to the drawings, in which:

FIG. 4 illustrates a flow diagram for streaming media, according to an embodiment of the present disclosure.

DETAILED DESCRIPTION

Figure 1:
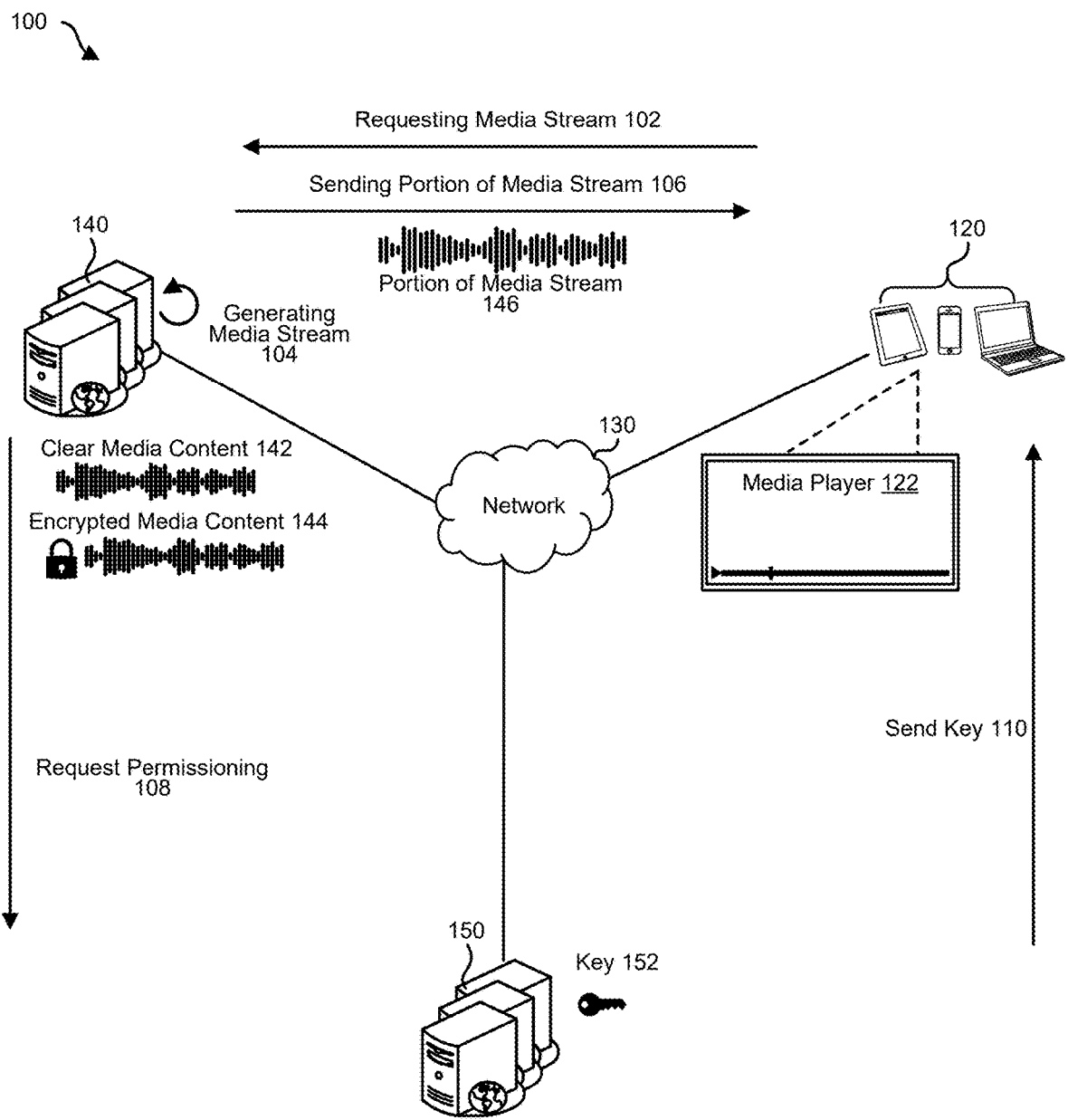
FIG. 1 illustrates an example system for streaming media, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Digital streaming is one popular method for consumers of entertainment content to access their preferred media sources. Digital streaming is available on a variety of platforms, such as smartphones, tablets, or smart televisions (e.g., televisions that execute native content streaming applications and/or televisions that connect to smart set top boxes), and users of such devices benefit from the convenience and variety of large libraries of content (e.g., video content such as movies or television programs, audio content such as audio books or podcasts, video games, etc.) available on demand.

In providing on-demand media, streaming media has become important. Instead of having to wait for media to be downloaded to their devices, users can stream media through a data connection. Nonetheless, media is oftentimes subject to digital rights management (DRM) that dictates how the media can be used. In order to download or stream media, a DRM backend may need to permit the user and their associated devices(s) to play or otherwise use the media. The media subject to DRM can be encoded or encrypted such that a user and their associated device(s) may only be allowed use the media if they can decode or decrypt the media. The DRM backend may provide the decoder/decrypter (for example, a key) once permissioning for the user and their associated device(s) has been verified and/or approved. Backend systems, servers, and entities can communicate to determine if the user and their associated device(s) have permission to use the media, which can take significant time (e.g., as long as 30-60 seconds in some cases, or longer). This could lead to a user experience where the user would have to wait for permission to stream media.

However, in providing on-demand media through streaming, users may be unable to wait for the full time period of permissioning from DRM. As such, the streaming backend can, according to established DRM, generate a stream to be sent in segments to the streaming device. The stream can be divided into a clear portion and a permissioned portion. The clear portion can be unencrypted and can be played by the streaming device without needing to receive a key from the DRM backend. The permissioned portion, which is oftentimes the remaining portion of the media, can be encrypted to prevent playing of that portion of the media without the key which is indicative of permission from the DRM backend. The clear portion, which is oftentimes a short segment, can be sent to the playback device first such that the playback device can start streaming the on-demand media nearly instantaneously. Before and while the user is streaming the clear portion of the media, permissioning through DRM can be resolved such that the streaming device receives the key to decrypt the permissioned portion of the media. This allows the user to experience no perceived interruption to their streaming media.

In some cases, streaming backends can have the media pre-divided into a clear portion at the beginning of the media and a permissioned portion for the remainder of the media. This allows for minimal perception of permissioning through DRM from a user's perspective. However, having a predefined clear portion could either be too long or too short compared to the actual time required for permissioning. If the predefined clear portion is too long, then a user who is unauthorized can play more of the media with no repercussion. If the predefined clear portion is too short, then a user may experience an abrupt interruption to their streaming media as the permissioning process continues.

Similarly, a user may want to begin streaming media from the middle of the media. For example, a user may be streaming an audiobook (e.g., corresponding to a novel) that is 15 hours long. Typically, a user streaming an audiobook would not want to listen to the entire audiobook in one sitting, but rather stream parts of the audio book. As such, a user may want to begin streaming from a point 2, 5, or 8 hours into the 15-hour audiobook. In many circumstances, every time a stream begins, the DRM backend needs to verify permissioning of the user and the associated device(s) for streaming the media. If the media is pre-divided into a clear portion at the beginning of the media and a remaining permissioned portion, the streaming device is unable to decrypt, and therefore cannot play, the permissioned portion until permissioning has been verified.

This application describes techniques related to systems, methods, and non-transitory computer readable media that inject clear lead into media streams, thus alleviating the problems described above. When generating a media stream, a clear portion (which can be referred to as clear lead) can be created of variable length that corresponds to a streaming start point in the media (for example, the streaming start point could be 30 minutes into a 3-hour video). The variable length of the clear portion can be based on average permissioning times and can be adjusted dynamically. Enabling the generation of a clear portion of a media stream at any start point in the media can improve user experience as the playing of media from the middle of the media can begin more quickly and fluidly without interruption of service to the user. Being able to inject clear lead of variable length and at any point of media enables dynamic clear lead injection.

This application also describes techniques related to systems, methods, and non-transitory computer readable media that ensures that the transition from the clear portion to the permissioned portion is at a silence point. Transitioning from a clear portion to a permissioned portion of a media stream can cause a noticeable distortion. For example, a user may hear a pop. The techniques described herein can be used to make the transition from a clear portion to a permissioned portion occur at a silence point such that no noticeable distortion is experienced by a user.

FIG. 1 illustrates an example system 100 for sending and receiving a media stream (receiving a media stream can also be referred to as streaming media). A user may want to stream media through a streaming device 120. A streaming device 120 can be any kind of computing device and/or user device. Media can be streamed through an application on the streaming device 120 and controlled through the use of a graphic user interface (GUI) which may include a media player 122. The user can request to stream media through the GUI of the streaming device 120. At 102, the streaming device 120 sends a request for a media stream to the streaming backend 140 (for example, over a network 130). The streaming request can indicate a specific media content to be streamed and a starting point within the media content at which the stream should begin.

At 104, the streaming backend 140 generates a media stream to be sent to the streaming device 120 corresponding to the request based on the specific media content requested and the requested starting point. Media content refers to a specific piece of media in a specific form. For example, a particular movie, song, audiobook, sample of any media, and the like are media content. A media stream is generated from the media content and the media stream is sent, in portions, to the streaming device 120 for playback. Media content tends to be high fidelity and relatively lossless while a media stream may have various codecs, encoders, and compressions run on it in order to send to the streaming device 120.

The media stream can be generated to include a clear portion and a permissioned portion (which can also be referred to as the remaining portion). The clear portion is considered clear because it is not encrypted. The clear portion can also be referred to as clear lead. The permissioned portion is encrypted as described herein. The permissioned portion is encrypted to ensure that the streaming device and/or associated user has permission to stream the specific media content. For example, the permissioned portion can be encrypted because the specific media content is subject to DRM. Alternatively, the permissioned portion can be encrypted to ensure that payment has been received.

In some implementations, the media stream is generated such that the clear portion comes from a clear media content 142 which is unencrypted (clear is used herein to mean unencrypted). In some implementations, the media stream is generated such that the permissioned portion comes from an encrypted media content 144 that is encrypted as described herein. In some implementations, the media stream is generated from the clear media content 142, but the permissioned portion is encrypted by the streaming backend 140. The key that the streaming backend 140 uses for encryption can be received from the permissioning backend 150. The streaming backend 140 can include one or more computing devices (for example, servers) and one or more systems.

At 106, the streaming backend sends a portion of the media stream 146 to the streaming device 120. The portion of the media stream 146 can be used by the streaming device 120 to start streaming the media content. The streaming backend 140 can continue to send additional portions of the media stream to the streaming device 120. The portion of the media stream 146 can be wholly unencrypted, partially unencrypted and partially encrypted, or wholly encrypted. The user device 110 can begin presenting the portion of media content 146. The streaming device 120 can request additional portions of the media stream as the stream is played through the media player 122. Similarly, the streaming backend 140 can periodically send additional portions of the media stream to the streaming device 120.

At 108, the streaming backend 140 can request permissioning from the permissioning backend 150 (for example, over a network 130). The request for permissioning can include information about the streaming device 120, the associated user, and/or user account. The permissioning backend 150 can authorize the streaming of the media content. Authorization can include verification of the information about the user device, associated user, and/or user account. At 110, the permissioning backend 150 can send a key 152 to the streaming device 120. The key 152 can be used by the streaming device 120 to decrypt encrypted parts of the media stream received from the streaming backend 140. In some implementations, the streaming device 120 can request permissioning from the permissioning backend 150 (for example, over a network 130).

Streaming devices can be any type of computing devices and/or user devices such as, but not limited to, a mobile phone, a smart phone, a personal digital assistant (PDA), a laptop computer, a desktop computer, a server computer, a thin-client device, a tablet PC, etc. Similarly, the network 130 can include any type of network such as the Internet, a WAN, a LAN, and the like.

The streaming backend 140 may be a distributed computer network (e.g., a cloud network). The streaming backend 140 may include multiple systems connected via the network 130 across multiple geographic regions. The streaming backend 140 may include multiple sub-systems, as described in more detail in reference to FIG. 3, below, for generating the stream and injecting clear lead. The permissioning backend 150 may be a distributed computer network (e.g., a cloud network). The permissioning backend 150 may include multiple systems connected via the network 130 across multiple geographic regions.

Figure 2:
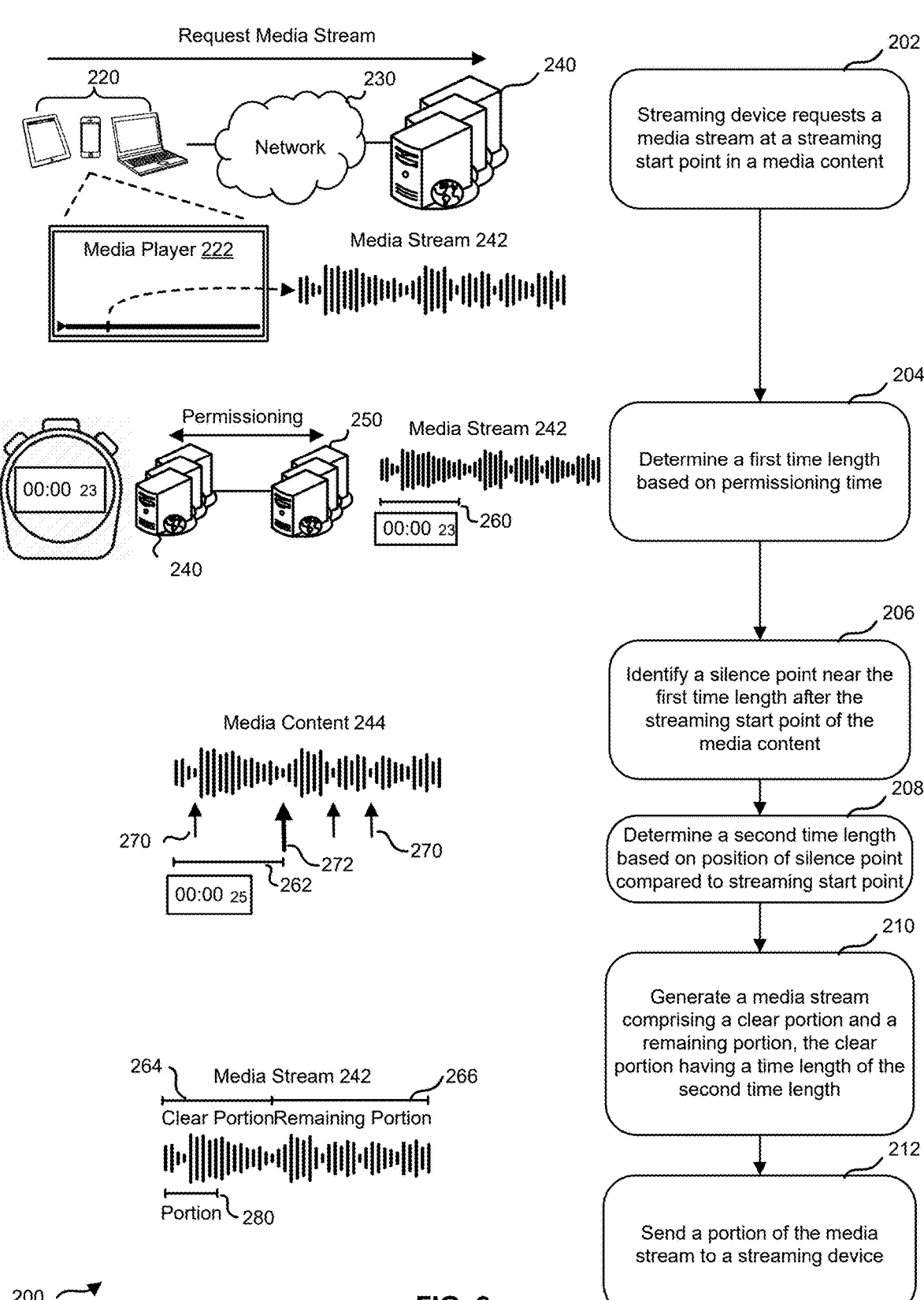
FIG. 2 illustrates a block diagram and a simplified flow diagram for injecting clear lead into streaming media, according to an embodiment of the present disclosure.

FIG. 2 illustrates an example technique 200 for injecting clear lead into streaming media, according to one or more embodiments. At block 202, a streaming device 220 can send to the streaming backend 240, a request for a media stream 242. The request from the streaming device 220 can be sent through a network 230. A streaming device 220 can send the request for a media stream 242 in response to a user indication through a GUI related to an application. The user indication can be an interaction with a media player 222 associated with the application.

The request for a media stream 242 can include a particular media content. For example, a media content can be a particular video, song, or audiobook. A media content can also be a sample of a video, song, or book. The request for a media stream 242 can also include a streaming start point in the media content. For example, a user may indicate to start streaming a video from 2 minutes and 14 seconds into the video rather than from the beginning of the video. In this example, a request for a media stream 242 will include a streaming start point of 2 minutes and 14 seconds.

Once the streaming backend 240 receives the request for a media stream 242, the streaming backend 240 can begin to generate a media stream 242. As described herein, at least part of the media stream 242 is unencrypted (or clear) and part of the media stream is encrypted. Permissioning from a permissioning backend 250 is required to decrypt the encrypted part of the media stream 242. As described herein, the transition between the clear portion 262 and the remaining portion 264 (or encrypted portion) can occur at silence points to minimize any noticeable effects of the transition for a user. Blocks 204-212 describe at least some example steps in generating a media stream 242 as described.

At 204, the streaming backend 240 determines a first time length 260. The first time length 260 is associated with a clear portion of the media stream 242. In some implementations, the first time length 260 is based on permissioning time. For example, permissioning time can be the time for the streaming backend 240 to request permission from and receive authorization from the permissioning backend 250. In some implementations, the permissioning backend 250 can be used for DRM of the media content. In some implementations, the permissioning backend 250 can be used to verify payment that was submitted in order to stream the media content. For example, a user may have purchased a viewing of a movie via a media stream, and the permissioning backend 250 can be used to verify that payment information provided by the user was proper.

At 206, the streaming backend 240 identifies a silence point 272 from a set of silence points 270 near the time length 260 after the streaming start point of the media content 244. In some implementations, silence points 270 are points in the media content 244 where the audio is below a threshold level. In some implementations, silence points 270 can be determined by the streaming backend 240 prior to the request for a media stream 242. In some implementations, silence points 270 can be received by the streaming backend 240 and stored as metadata related to the media content 244. In some implementations, the streaming backend 240 can request the silence points 270 from another computing device (for example, a server). In some implementations, at least some silence points 270 can be at the beginning or end of a segment of the media. For example, an audiobook can be segmented into chapters. The beginning and end of each chapter can be configured to be silence points 270. The streaming backend 240 can know that such media content (for example, the audiobook and/or the associated chapters) has silence points 270 at the beginning and ending of each chapter.

When identifying and/or selecting a silence point, the streaming backend 240 can use multiple criteria. For example, a time length 260 can be determined to be 5 seconds and a streaming start point can be determined to be at 2 minutes after the beginning of an audiobook. The streaming backend 240 can determine that there is a first silence point at 2 minutes, a second silence point at 2 minutes and 15 seconds, and a third silence point at 3 minutes. The streaming backend 240 can determine that the first silence point and the second silence point are the closest to the time length after the streaming start point, which is 2 minutes and 5 seconds. The first silence point (at 2 minutes) is only 5 seconds different from the time length after the streaming start point. In some implementations, the streaming backend 240 can select the closest silence point to the time length after the streaming start point. This can minimize the size of the clear portion 262 of the media stream 242. In some implementations, the streaming backend 240 can select the closest silence point after the time length after the streaming start point. In the example described above, this would be the second silence point at 2 minutes 15 seconds. Although the first silence point is closer to the time length after the streaming start point, using that first silence point as the transition could result in the streaming device 220 not receiving permissioning from the permissioning backend 250 prior to the transition. Not receiving permissioning prior to the transition could lead to interruption of media playback for the user.

At 208, the streaming backend 240 can determine a second time length 262. The second time length 262 can be the time length between the streaming start point and the identified silence point 272. The second time length 262 can be used to determine the length of the clear 264 portion of the media stream 242. The remaining portion 266 (which can also be referred to as the encrypted portion or the permissioned portion) is the rest of the media stream 242.

At 210, the steaming backend 240 can generate a media stream 242. The media stream 242 can start at the streaming start point of the media content 244. The media stream 242 can have a time length of the media content 244 subtracted by the time length of the start of the media content 244 to the streaming start point. For example, if the media content is a 15-hour audiobook and the streaming start is at 8 hours 15 minutes, then the media stream 264 can be of length 6 hours and 45 minutes. In some implementations, the media stream 264 has a maximum time length that is less than the time length of the media content subtracted by the time length of the start of the media content 244 to the streaming start point. In the example previously stated where the media stream 264 can be of length 6 hours and 45 minutes, instead the media stream 264 can be a length of 1 hour.

The media stream 242 includes a clear portion 264 and a remaining portion 266. The clear portion 264 has a time length of the second time length 262. The clear portion 264 is not encrypted. The clear portion 264 can be generated from clear media content (for example, the clear media content 142 of FIG. 1). The clear media content can represent an unencrypted version of the media content (for example, a piece of audio, video, or other media). The remaining portion 266 represents the rest of the length of the media stream 264. For example, if the media stream 264 is 4 hours long and the clear portion 264 is 12 minutes, then the remaining portion 266 can have a length of 3 hours 48 minutes.

At 212, the streaming backend 240 can send a portion 280 of the media stream 242 to the streaming device 220. The portion 280 can include a part of the clear portion 264 and/or a part of the remaining portion 266. For example, a media stream 242 with a time length of 30 minutes can have a clear portion 264 with a time length of 4 minutes, which would leave a remaining portion 266 of 26 minutes. The streaming backend 240 can send a portion 280 with length 3 minutes as needed by the streaming device. A first sending of a portion 280 can be the first 3 minutes of the media stream 242. The first 3 minutes are all a part of the clear portion 264. A second sending of a portion 280 can be the next 3 minutes which include a remaining 1 minute of clear portion 264 and 2 minutes of remaining portion 266. A third sending of a portion 280 can be a third 3 minutes which are all a part of the remaining portion 266.

In some implementations, identification of a silence point near the first time length after the streaming start point of the media content is not necessary. Instead, when generating the media stream, the clear portion of the media stream can have a time length of the first time length. Nonetheless, the generation of the media stream can generate a media stream starting from a streaming start point that is not at the beginning of the media content. For example, the media stream can start at 2 hours 5 minutes and 12 seconds into the media content. Such a media stream can still include a clear portion and a remaining portion as described herein. Such implementations (as well as other implementations described herein) can inject clear lead into a media stream regardless of the streaming start point requested by the streaming device.

Figure 3:
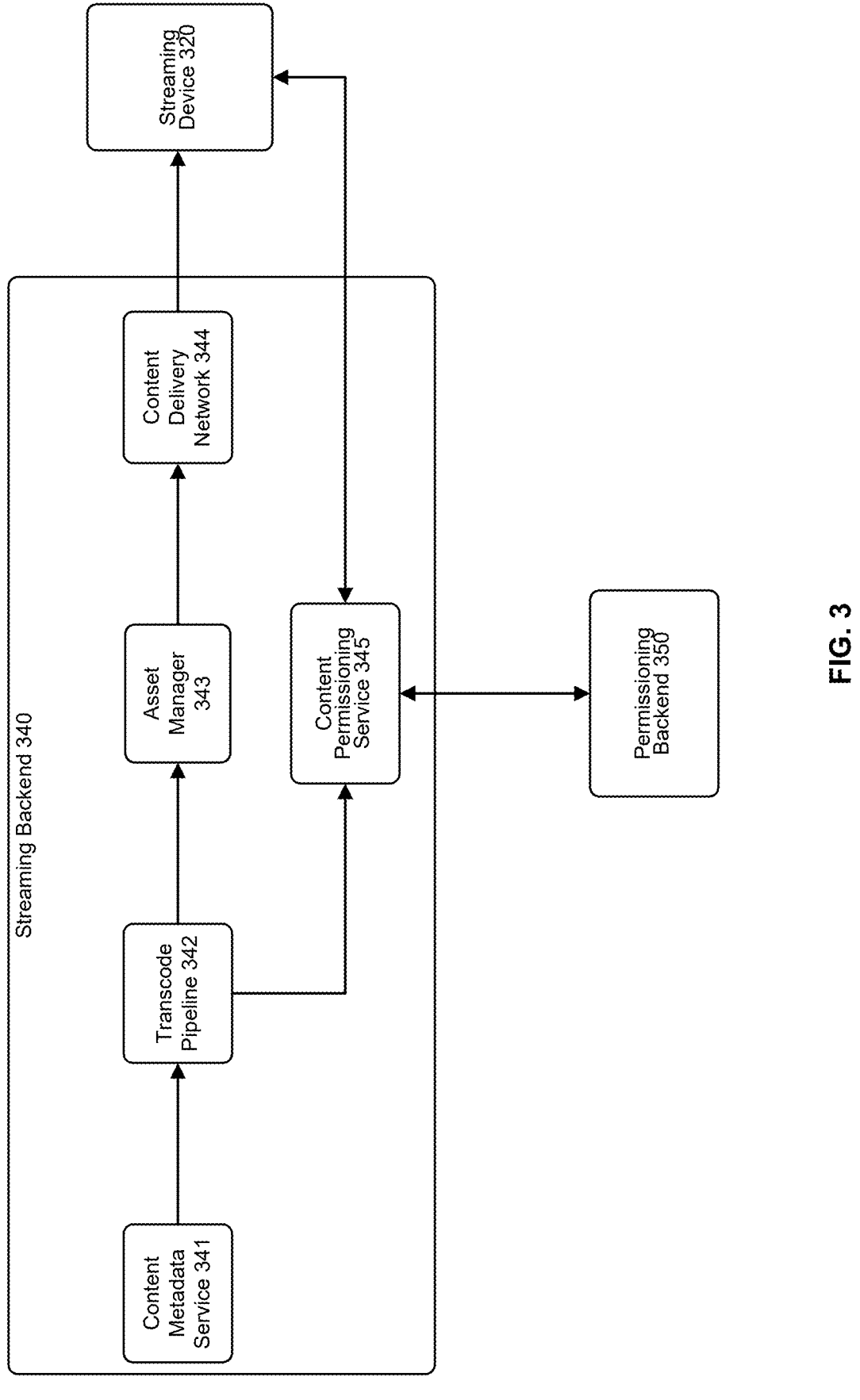
FIG. 3 illustrates a block diagram of a system for streaming media, according to an embodiment of the present disclosure.

FIG. 3 illustrates an example block diagram of a system 300 for dynamically injecting clear lead. For example, the streaming backend 340 generates the media stream to send to the streaming device 320. Permissioning from the permissioning backend 350 is used by the streaming device 320 to decrypt the encrypted parts of the media stream.

The streaming backend 340 (for example, the streaming backend 140 of FIG. 1) includes a content metadata service 341, a transcode pipeline 243, an asset manager 343, a content delivery network 344, and a content permissioning service 345. The streaming backend 340 can also include other systems. The streaming backend 340 generates a media stream (for example, the media stream 242 of FIG. 2) from media content (for example, the media content 244 of FIG. 2) to send to the streaming device 320 (for example, the streaming device 120 of FIG. 1). The media stream can include a clear portion and a remaining portion as described above in relation to the other figures. The remaining portion can be encrypted such that the streaming device 320 cannot decrypt, and therefore play, the remaining portion without a decryption key. The streaming device 320 can receive the decryption key from the permissioning backend 350, directly from the permissioning backend 350 or via the streaming backend 340.

The content metadata service 341 can be used to enter content metadata surrounding the media content. For example, content metadata can include the author, title, cover art, and other information that can be displayed or used by the streaming device 320. The content metadata can be forwarded to the transcode pipeline 342 and other systems in the streaming backend 340 to be sent to the streaming device 320.

The transcode pipeline 342 can generate transcoded media by transcoding the associated media content from a first format to another format based on the needs of the streaming device 320. The transcode pipeline can generate a clear transcoded media from a clear media content version (for example the clear media content 142 of FIG. 1) of the media content. The transcode pipeline 342 can generate an encrypted transcoded media from an encrypted media content version (for example the encrypted media content 144 of FIG. 1) of the media content. In some implementations, the transcode pipeline 342 can generate a clear transcoded media and an encrypted transcoded media from single a clear media content (for example the clear media content 142 of FIG. 1). The transcode pipeline 342 can encrypt the encrypted transcoded media. The transcode pipeline 342 can also generate multiple other versions of the transcoded media as required by the streaming device 320. For example, the transcode pipeline 342 can generate a low quality, medium quality, and high quality version of the transcoded media. These different quality versions can be used based on the bandwidth available in transmitting to the streaming device 320.

The transcode pipeline 342 can also generate metadata about the transcoded media to send to the asset manager 343. One such piece of metadata is the location of silence points as described in relation to the figures above. The transcode pipeline 342 can determine the location of silence points in the media content and associated transcoded media. In some implementations, the transcode pipeline 342 identifies the silence points in the media content. In such an implementation, the transcode pipeline 342 can receive a parameter defining a threshold level for audio in the media content, where points below that threshold level can be identified as a silence point. The transcode pipeline 342 can also receive another parameter defining a minimum length of time (or number of frames) that the media content must have audio below the threshold level in order to be identified as a silence point. The minimum length of time or number of frames can be determined based on how quickly a decoder on the streaming device 320 for decoding the remaining (or encrypted portion) of a media stream. In some implementations, the transcode pipeline 342 receives the silence points in the media content.

The transcode pipeline 342 can also generate other types of metadata. For example, the metadata can include locations for the transcoded media that are going to be used to generate the media stream. Similarly, the metadata can be used to determine chunks of the transcoded media by dictating the start of a section and the end of a section. For example, the metadata can include a byte range indicating the start of a 10 second portion of the media and the end of the 10 second portion of the media.

The asset manager 343 can store the transcoded media (both the clear transcoded media and the encrypted transcoded media) generated by the transcode pipeline 342. The asset manager 343 can also store media metadata about the media content and the transcoded media, for example, the metadata generated by the transcode pipeline 342. The media metadata can include where the silence points are in the media content and the associated transcoded media.

The content delivery network 344 can generate the media stream. The content delivery network 344 can receive or read the transcoded media (both the clear transcoded media and the encrypted transcoded media) from the asset manager 343. The content delivery network 344 can receive or read the media metadata from the asset manager 343 to assemble the media stream. For example, the content delivery network 344 can receive the streaming start point in order to generate the media stream at the correct start point.

The content delivery network 344 can also receive and read metadata about the transcoded media from the asset manager. This metadata can include information like bitrates, sample rates, and the byte ranges for different segments of the transcoded media. The metadata can also include the codec, the overall duration of the media content, the minimum and maximum bitrates, and whether there is any encryption (for example, in relation to DRM).

The content delivery network 344 can receive parameters when generating the media stream. For example, the content delivery network 344 can receive parameters related to time length for permissioning (for example, the first time length 260 of FIG. 2) to determine a first time length. The content delivery network 344 can also determine the nearest silence point to the first time length after the streaming start point. The content delivery network 344 can receive or read the media metadata from the asset manager 343 as to where the silence points are in the transcode media. The content delivery network 344 can then determine a second time length (for example, the second time length 262 of FIG. 2) which is associated with a time length for the clear portion of the media stream. The content delivery network 344 can generate the media stream including a clear portion at the beginning of the second time length, and a remaining portion for the rest of the media stream.

The content delivery network 344 can also generate manifest files, which store metadata about the media stream. The manifest files can be used by the content delivery network 344 and the streaming device 320.

The content delivery network 344 can send a portion (for example, the portion 280 of FIG. 2) of the media stream to the streaming device 320. The portion does not necessarily correspond to the clear portion or the remaining portion of the media stream, as described in relation to the above figures. The streaming device 320 can also request segments of the media stream from the content delivery network 344 in order to create a buffer for playback of the media stream.

The content permissioning service 345 can be used, by the streaming backend 340, to obtain permissioning for the encrypted portion (or remaining portion) of the media content from the permission backend 350. In some implementations, the content permission service 345 receives permissioning information from the transcode pipeline 342. The permissioning information can be used by the content permissioning service 345 to generate a permissioning request to send to the permissioning backend 350. In some implementations, the content permissioning service 345 sends a permissioning request to the permissioning backend 350 after receiving a request for permissioning from the streaming device 320. Once the permissioning backend 350 processes the permissioning request (for example, by verifying any combination of: the streaming device 320, a user associated with the streaming device 320, and the streaming backend 340), the permissioning backend 350 can send authorization to the content permissioning service 345. In some implementations, the permissioning backend 350 can process the permissioning request, but wait to provide authorization to the content permissioning service 345 until a request for the decryption key is sent from the streaming device 320. The request for the decryption key can be directly sent by the streaming device 320 to the permissioning backend 350 or through the content permissioning service 345. The authorization can be accompanied by a decryption key. The content permissioning service 345 can then send the decryption key to the streaming device 320. The streaming device 320 can then decrypt the remaining portion (the encrypted portion) of the media stream.

FIG. 4 illustrates an example process 400 for injecting clear lead, in accordance with one or more embodiments. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 402, the streaming backend (for example, the streaming backend 140 of FIG. 1) can receive a request to stream media. As described in more detail in reference to the figures above, the request to stream media can originate from a streaming device (for example, the streaming device 120 of FIG. 1). The request can include a media content and a streaming start point in the media content. The media content can be a video or audio file that can correspond to media such as a movie, song, audiobook, samples of such, or any other video or audio media. The streaming start point can be at a point between a beginning of the media content and an end of the media content. In some implementations, the streaming start point can be 30 seconds or later than the beginning of the media content.

At block 404, the streaming backend can determine a first time length based at least in part on time to receive permissioning. As described in more detail in reference to the figures above, the streaming backend can determine a time to receive permissioning. The streaming backend can estimate the time to receive permissioning from a permissioning backend (for example, the permissioning backend 150 of FIG. 1). The estimate to receive permissioning from the permissioning backend can be based on a number of factors including past time to receive permissioning, prevailing intra-network and inter-network conditions and characteristics, known capabilities of hardware of the streaming backend, network, and permissioning backend, and the like. Permissioning can be associated with media rights licensing and/or DRM. Permissioning can be associated with transaction verification.

At block 406, the streaming backend can determine a silence point in the media content based at least in part on the streaming start point, the first time length, and identified silence points in the media content. As described in more detail in reference to the figures above, determining the silence point includes determining one or more silence points in the media content from which the media stream is generated. Silence points can be any audio from the media content that is below a certain threshold level. The threshold level can be a certain intensity or power rating in relation to a normalized level. For example, the threshold level could be a certain decibel rating when the audio is normalized to a certain audio decibel level. In some implementations, the silence points are determined by the streaming backend. In some implementations, the streaming backend receives the silence points from another computer system. In some implementations, the streaming backend identifies a silence point nearest to the first time length after the streaming start point in the media content. In some implementations, the streaming backend identifies a silence point nearest after the first time length from the streaming start point in the media content, disregarding any silence points before the first time length after the streaming start point in the media content.

At block 408, the streaming backend can determine a second time length based at least in part on the silence point and the streaming start point, the second time length defining a clear portion. As described in more detail in reference to the figures above, the second time length represents the time length between the streaming start point and the determined silence point. The second time length can be used to determine the time length for the clear portion when the media stream is generated.

At block 410, the streaming backend can generate a media stream including a clear portion and a remaining portion. The media stream represents the media that will actually be played from by the streaming device. As described in more detail in reference to the figures above, the media stream is a processed version of the media content. The media stream may only represent a fraction of the media content or have had multiple transformations or changes applied. For example, parts of the media stream can be encrypted, transcoded, encoded, upsampled or downsampled, or had the fidelity changed (for example, lowering the bitrate, or lowering audio quality from 10-bit to 8-bit audio). The clear portion can have a time length of the second time length. The clear portion can be unencrypted. The remaining portion can be encrypted. For example, the remaining portion may be encrypted with a key that needs to be received from the permissioning backend once the streaming device and/or associated user using the streaming device have been verified and/or authorized.

At block 412, the streaming backend can send a portion of the media stream to a streaming device. As described in more detail in reference to the figures above, the portion sent to the streaming device does not necessarily correspond to the clear portion and/or the remaining portion of the media stream. The portion sent to the streaming device can include any part of the media stream. For example, the portion sent to the streaming device could be any subset or any combination of subsets of the media stream, clear portion, and/or remaining portion.

Figure 5:
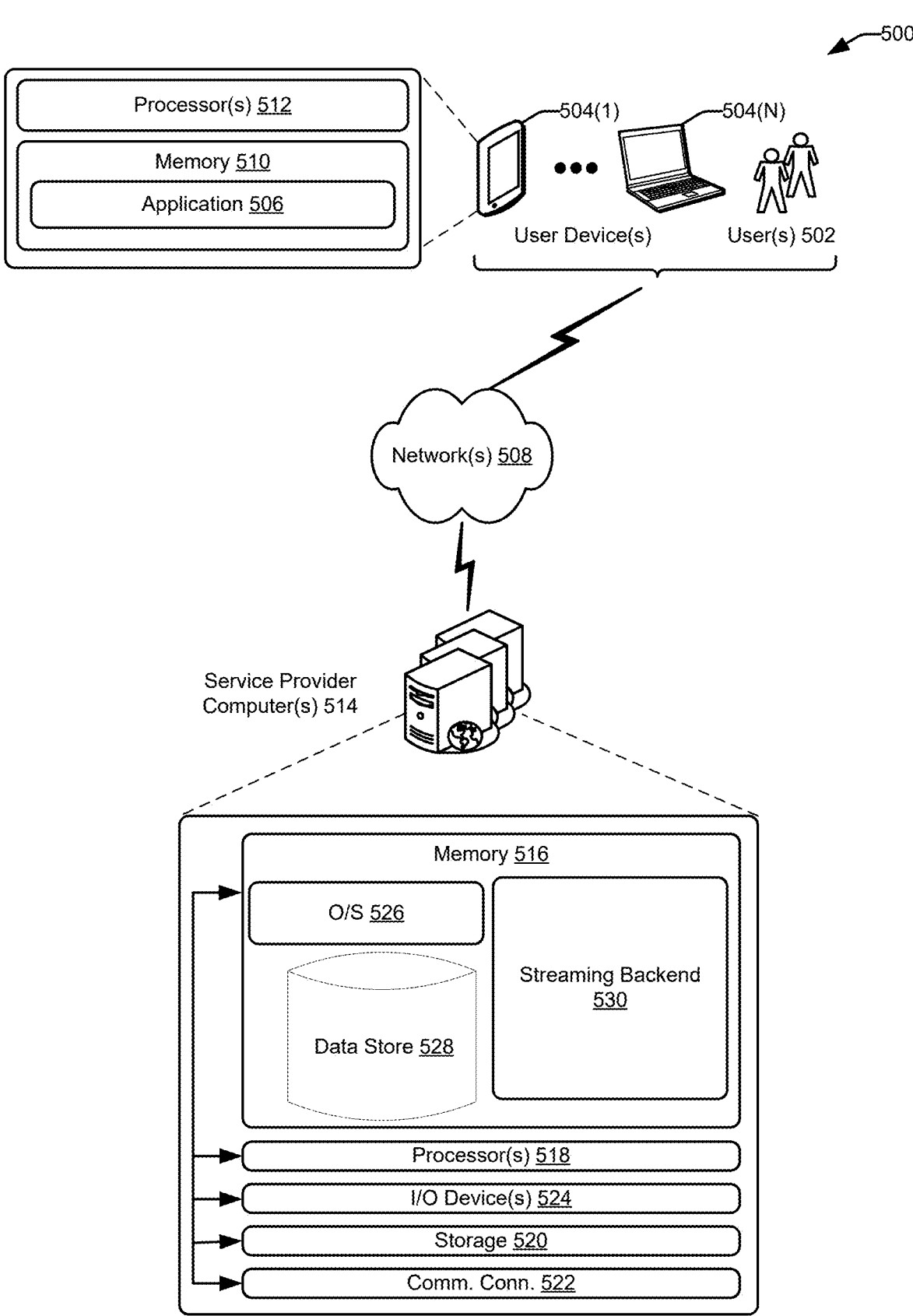
FIG. 5 is a diagram illustrating an example architecture for streaming media, in accordance with at least one embodiment.

FIG. 5 is a diagram illustrating an example architecture 500 for implementing a streaming service, in accordance with at least one embodiment. In architecture 500, one or more users 502 (e.g., customers, users, consumers, etc.,) may utilize user computing devices 504(1)-(N) (collectively, user devices 504) to access an application 506 or a user interface (UI) accessible through the application 506, via one or more networks 508. The application 506 can be any browser control or native application that can access and display a network page or other information such as a user interface of a native software application for enabling the selection or interaction of content. A native software application may include an application or program that has been developed for use on a particular platform (such as an operating system) or a particular device (such as a particular type of mobile device or user device 504). In embodiments, the user device 504 may include one or more components for enabling the user 502 to interact with the application 506.

The user devices 504 may include at least one memory 510 and one or more processing units or processor(s) 512. The memory 510 may store program instructions that are loadable and executable on the processor(s) 512, as well as data generated during the execution of these programs. Depending on the configuration and type of the user devices 504, the memory 510 may be volatile (such as random access memory (RAM)) and/or non-volatile (such as read-only memory (ROM), flash memory, etc.). The user devices 504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 504. In some implementations, the memory 510 may include multiple different types of memory, such as static random access memory (SRAM), dynamic random access memory (DRAM), or ROM.

Turning to the contents of the memory 510 in more detail, the memory 510 may include an operating system and one or more application programs or services for implementing the features disclosed herein. Additionally, the memory 510 may include one or more modules for implementing the features described herein including a streaming backend 530.

The architecture 500 may also include one or more service provider computers 514 that may, in some examples, provide computing resources such as, but not limited to, client entities, low latency data storage, durable data store, data access, management, virtualization, hosted computing environment or "cloud-based" solutions, electronic content performance management, etc. The service provider computers 514 may implement or be an example of the service provider computer(s) described herein with reference to FIGS. 1-4 and throughout the disclosure. The one or more service provider computers 514 may also be operable to provide site hosting, computer application development, and/or implementation platforms, combinations of the foregoing, or the like to the one or more users 502 via user devices 504.

In some examples, the networks 508 may include any one or a combination of many different types of networks, such as cable networks, the Internet, wireless networks, cellular networks, and other private and/or public networks. While the illustrated examples represents the users 502 communicating with the service provider computers 514 over the networks 508, the described techniques may equally apply in instances where the users 502 interact with the one or more service provider computers 514 via the one or more user devices 504 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 514 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 514 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 514 may be in communication with the user device 504 via the networks 508, or via other network connections. The one or more service provider computers 514 may include one or more servers, perhaps arranged in a cluster or as individual servers not associated with one another.

In one illustrative configuration, the one or more service provider computers 514 may include at least one memory 516 and one or more processing units or processor(s) 518. The processor(s) 518 may be implemented as appropriate in hardware, computer-executable instructions, firmware, or combination thereof. Computer-executable instruction or firmware implementations of the processor(s) 518 may include computer-executable or machine-executable instructions written in any suitable programming language to perform the various functions described when executed by a hardware computing device, such as a processor. The memory 516 may store program instructions that are loadable and executable on the processor(s) 518, as well as data generated during the execution of these programs. Depending on the configuration and type of the one or more service provider computers 514, the memory 516 may be volatile (such as RAM) and/or non-volatile (such as ROM, flash memory, etc.). The one or more service provider computers 514 or servers may also include additional storage 520, which may include removable storage and/or non-removable storage. The additional storage 520 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 516 may include multiple different types of memory, such as SRAM, DRAM, or ROM.

The memory 516, the additional storage 520, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 516 and the additional storage 520 are all examples of non-transitory computer storage media. Additional types of non-transitory computer storage media that may be present in the one or more service provider computers 514 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 514. Combinations of any of the above should also be included within the scope of non-transitory computer-readable media.

The one or more service provider computers 514 may also contain communication connection interface(s) 522 that allow the one or more service provider computers 514 to communicate with a data store, another computing device or server, user terminals, and/or other devices on the networks 508. The one or more service provider computers 514 may also include I/O device(s) 524, such as a keyboard, a mouse, a pen, a voice input device, a touch input device, a display, speakers, a printer, etc.

Turning to the contents of the memory 516 in more detail, the memory 516 may include an operating system 526, one or more data stores 528, and/or one or more application programs or services for implementing the features disclosed herein including the streaming backend 530. In accordance with at least one embodiment, the streaming backend 530 may be configured to at least dynamically inject clear lead into media streams, as described in more detail in reference to FIGS. 1-4, and to select and implement an event state indicator. In some embodiments, the streaming backend 530 may be configured inject the clear lead to end at a silence point between a clear (unencrypted) portion of a media stream and an encrypted (remaining) portion of the media stream.

Figure 6:
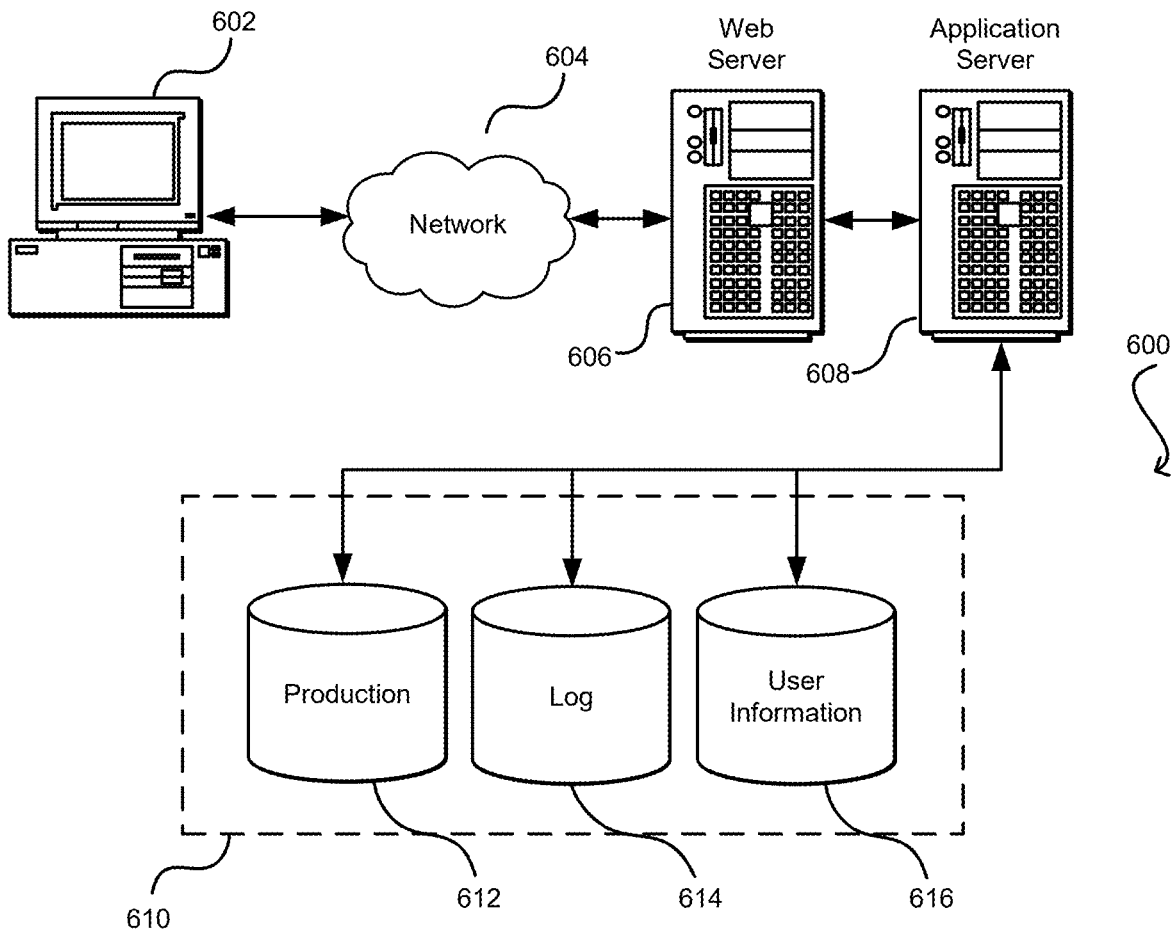
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
transmitting, by a computing device, a request for a server device to stream media content to the computing device, wherein the request includes a media content identifier and a streaming start point in the media content;
receiving, by the computing device, an encrypted portion of a media stream for the media content, wherein the encrypted portion is encrypted by an encryption key, wherein the encrypted portion begins at a silence point, and wherein the silence point is at or after a threshold time length beyond the streaming start point;
receiving, by the computing device, a decryption key; and
presenting, by the computing device, the encrypted portion of the media stream.

2. The computer-implemented method of claim 1, wherein the silence point is determined from a set of identified silence points, and wherein the silence point is an identified silence point of the set of identified silence points nearest to the threshold time length at or after the streaming start point in the media content.

3. The computer-implemented method of claim 1, wherein the silence point is defined by audio in the media content that is below a threshold value.

4. The computer-implemented method of claim 1, wherein the streaming start point is at a point between, but not including, a beginning of the media content and an end of the media content.

5. The computer-implemented method of claim 1, wherein the media content is an audio file associated with a book.

6. One or more non-transitory computer-readable media comprising computer-executable instructions that, when executed by one or more processors of a computing device, cause the computing device to perform operations comprising:
transmitting, by the computing device, a request for a server device to stream media content to the computing device, wherein the request includes a media content identifier and a streaming start point in the media content;
receiving, by the computing device, an encrypted portion of a media stream for the media content, wherein the encrypted portion is encrypted by an encryption key, wherein the encrypted portion begins at a silence point, and wherein the silence point is at or after a threshold time length beyond the streaming start point;
receiving, by the computing device, a decryption key; and
presenting, by the computing device, the encrypted portion of the media stream.

7. The one or more non-transitory computer-readable media of claim 6, wherein the media content is an audio file.

8. The one or more non-transitory computer-readable media of claim 7, wherein the audio file is associated with a book.

9. The one or more non-transitory computer-readable media of claim 6, wherein the computing device is a streaming device.

10. The one or more non-transitory computer-readable media of claim 6, comprising further computer-executable instructions that, when executed by one or more processors of the computing device, cause the computing device to perform further operations comprising decrypting, by the computing device, the encrypted portion of the media stream.

11. The one or more non-transitory computer-readable media of claim 6, wherein the streaming start point is at a point greater than 30 seconds after a beginning of the media content.

12. The one or more non-transitory computer-readable media of claim 6, wherein the silence point is defined by audio in the media content that is below a threshold value.

13. The one or more non-transitory computer-readable media of claim 6, comprising further computer-executable instructions that, when executed by one or more processors of the computing device, cause the computing device to perform further operations comprising:

receiving a clear portion of the media stream for the media content, wherein the clear portion is unencrypted, and wherein the clear portion has a time length from the streaming start point to the silence point; and presenting the clear portion of the media stream.

14. The one or more non-transitory computer-readable media of claim 6 wherein the silence point is determined from a set of identified silence points, wherein the silence point is an identified silence point of the set of identified silence points nearest to the threshold time length at or after the streaming start point in the media content.

15. A computing device comprising:

one or more processors; and one or more memory storing instructions that, upon execution by the one or more processors, configure the computing device to:

transmit a request for a server device to stream media content to the computing device, wherein the request includes a media content identifier and a streaming start point in the media content;

receive an encrypted portion of a media stream for the media content, wherein the encrypted portion is encrypted by an encryption key, wherein the encrypted portion begins at a silence point, and wherein the silence point is at or after a threshold time length beyond the streaming start point;

receive a decryption key; and present the encrypted portion of the media stream.

16. The computing device of claim 15, wherein the silence point is determined from a set of identified silence points, wherein the set of identified silence points are defined by audio in the media content being below a threshold value.

17. The computing device of claim 16, wherein the decryption key is associated with the encryption key.

18. The computing device of claim 15, wherein the one or more memory store further instructions that, upon execution by the one or more processors, further configure the computer system to:

receive a clear portion of a media stream for the media content, wherein the clear portion is unencrypted, wherein the clear portion has a time length from the streaming start point to the silence point; and present the clear portion of the media stream.

19. The computing device of claim 15, wherein the threshold time length is based at least in part on a time length to receive the decryption key after sending the request to stream media content.

20. The computing device of claim 15, wherein the one or more memory store further instructions that, upon execution by the one or more processors, configure the computer system to determine the silence point.

\* \* \* \* \*